(12) United States Patent
Parkin et al.

(10) Patent No.: US 11,274,990 B2
(45) Date of Patent: Mar. 15, 2022

(54) OPTICAL FIBER

(71) Applicant: British Telecommunications Public Limited Company, London (GB)

(72) Inventors: Neil Parkin, London (GB); Malcolm Campbell, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 16/632,421

(22) PCT Filed: Jul. 18, 2018

(86) PCT No.: PCT/EP2018/069502
§ 371 (c)(1),
(2) Date: Jan. 20, 2020

(87) PCT Pub. No.: WO2019/016263
PCT Pub. Date: Jan. 24, 2019

(65) Prior Publication Data
US 2020/0209106 A1  Jul. 2, 2020

(30) Foreign Application Priority Data

Jul. 20, 2017  (EP) .................................. 17182399

(51) Int. Cl.
G01M 11/00 (2006.01)
G02B 6/02 (2006.01)
G02B 6/38 (2006.01)

(52) U.S. Cl.
CPC ......... *G01M 11/31* (2013.01); *G02B 6/02076* (2013.01); *G02B 6/385* (2013.01)

(58) Field of Classification Search
CPC .................................................. G01M 11/31
(Continued)

(56) References Cited

U.S. PATENT DOCUMENTS 5,142,606 A   8/1992  Carney et al.
5,375,185 A  12/1994  Hermsen et al.
(Continued)

FOREIGN PATENT DOCUMENTS

CN   1726664 A    1/2006
CN  101292455 A  10/2008
(Continued)

OTHER PUBLICATIONS

Great Britain Examination Report, Application No. GB1711705.2, dated Jan. 15, 2018, 7 pages.
(Continued)

*Primary Examiner* — Kara E. Geisel
*Assistant Examiner* — Omar H Nixon
(74) *Attorney, Agent, or Firm* — Patterson Thuente Pedersen, P.A.

(57) ABSTRACT

An optical fiber including a plurality of embedded optical reflectors distributed periodically along the length of the fiber and a method of quantifying loss associated with an optical connector that is connected to optical fiber comprising a plurality of embedded optical reflectors distributed periodically along the length of the fiber. The method includes inserting an optical signal into the fiber through the optical connector; measuring a component of the optical signal reflected by at least one of the plurality of embedded optical reflectors, in which the component is received through the optical connector; calculating the difference in power level between the inserted and reflected signals; and quantifying, based on the calculated power level difference and the reflectivity of the embedded optical reflector, the loss associated with the optical connector.

14 Claims, 4 Drawing Sheets

(58) Field of Classification Search
USPC .................................................. 356/73.1
See application file for complete search history.

(56) References Cited

U.S. PATENT DOCUMENTS

| | | | |
|---|---|---|---|
| 5,596,670 | A | 1/1997 | Debortoli et al. |
| 5,625,450 | A * | 4/1997 | Ikeno .................... G01M 11/31 356/73.1 |
| 5,832,011 | A * | 11/1998 | Kashyap ................ G02B 6/421 372/23 |
| 6,075,628 | A | 6/2000 | Fisher et al. |
| 6,134,363 | A | 10/2000 | Hinson et al. |
| 6,249,633 | B1 | 6/2001 | Wittmeier, II et al. |
| 6,323,981 | B1 | 11/2001 | Jensen |
| 6,327,060 | B1 | 12/2001 | Otani et al. |
| 6,370,309 | B1 | 4/2002 | Daoud |
| 6,388,741 | B1 | 5/2002 | Beller |
| 6,418,266 | B1 | 7/2002 | Vitantonio |
| 6,424,443 | B1 | 7/2002 | Brindel et al. |
| 6,434,313 | B1 | 8/2002 | Clapp, Jr. et al. |
| 6,534,997 | B1 | 3/2003 | Horishita et al. |
| 6,539,160 | B2 | 3/2003 | Battey et al. |
| 6,587,974 | B1 | 7/2003 | Majd et al. |
| 7,049,523 | B2 | 5/2006 | Shuman et al. |
| 7,489,835 | B1 * | 2/2009 | Xia .................... G02B 6/02104 385/12 |
| 7,711,267 | B2 | 5/2010 | Wellbrock et al. |
| 7,817,891 | B2 | 10/2010 | Lavenne et al. |
| 8,189,983 | B2 | 5/2012 | Brunet et al. |
| 8,655,135 | B2 | 2/2014 | Barker et al. |
| 9,271,058 | B2 | 2/2016 | Lord |
| 9,560,429 | B2 | 1/2017 | Lord |
| 9,654,248 | B2 | 5/2017 | Wright et al. |
| 9,693,123 | B2 | 6/2017 | Lord |
| 9,748,021 | B2 | 8/2017 | Warren et al. |
| 9,860,012 | B2 | 1/2018 | Wright et al. |
| 9,905,989 | B1 * | 2/2018 | Johnson ................ H01S 3/1603 |
| 10,432,302 | B1 | 10/2019 | Delgado et al. |
| 2003/0194167 | A1 * | 10/2003 | Wang ................ G01D 5/35303 385/12 |
| 2003/0202765 | A1 | 10/2003 | Franklin et al. |
| 2003/0223725 | A1 | 12/2003 | Laporte et al. |
| 2004/0113056 | A1 * | 6/2004 | Everall .............. G01K 11/3206 250/227.23 |
| 2004/0173733 | A1 | 9/2004 | Korn |
| 2004/0240833 | A1 * | 12/2004 | Stegall ................ G01M 11/335 385/147 |
| 2005/0174563 | A1 | 8/2005 | Evans et al. |
| 2006/0263029 | A1 | 11/2006 | Mudd et al. |
| 2006/0263039 | A1 | 11/2006 | Chiang |
| 2007/0041006 | A1 | 2/2007 | Abbott |
| 2007/0076884 | A1 | 4/2007 | Wellbrock et al. |
| 2007/0098342 | A1 | 5/2007 | Temple Jr. et al. |
| 2007/0183732 | A1 | 8/2007 | Wittmeier et al. |
| 2007/0212063 | A1 | 9/2007 | Meli et al. |
| 2008/0232795 | A1 | 9/2008 | Klar et al. |
| 2010/0008631 | A1 | 1/2010 | Herbst |
| 2010/0150547 | A1 | 6/2010 | Xia et al. |
| 2011/0081125 | A1 | 4/2011 | Barker et al. |
| 2012/0195428 | A1 | 8/2012 | Wellbrock et al. |
| 2012/0217061 | A1 | 8/2012 | Runzel, IV et al. |
| 2012/0224846 | A1 | 9/2012 | Swanson et al. |
| 2014/0050451 | A1 | 2/2014 | Reagan et al. |
| 2014/0133844 | A1 | 5/2014 | Dahlfort et al. |
| 2014/0133845 | A1 | 5/2014 | Dahlfort et al. |
| 2014/0140669 | A1 | 5/2014 | Islam et al. |
| 2014/0147086 | A1 | 5/2014 | Chapman et al. |
| 2014/0216782 | A1 | 8/2014 | Erlendsson |
| 2014/0260638 | A1 | 9/2014 | Hood et al. |
| 2014/0341575 | A1 | 11/2014 | Choi et al. |
| 2015/0326955 | A1 | 11/2015 | Lord et al. |
| 2016/0013864 | A1 | 1/2016 | Rafel Porti et al. |
| 2016/0057515 | A1 | 2/2016 | Lord |
| 2016/0269115 | A1 * | 9/2016 | Brown .................. H04B 10/27 |
| 2016/0344470 | A1 | 11/2016 | Reddy Bovilla et al. |

FOREIGN PATENT DOCUMENTS

| | | |
|---|---|---|
| CN | 202093214 U | 12/2011 |
| CN | 102661755 A | 9/2012 |
| CN | 103154795 A | 6/2013 |
| CN | 103929251 A | 7/2014 |
| CN | 104092538 A | 10/2014 |
| CN | 104238057 A | 12/2014 |
| CN | 205484963 U | 8/2016 |
| CN | 105954831 A | 9/2016 |
| CN | 107465502 A | 12/2017 |
| DE | 29518024 U1 | 1/1996 |
| EP | 0108590 A1 | 5/1984 |
| EP | 0215668 A2 | 3/1987 |
| EP | 0428931 A2 | 5/1991 |
| EP | 0562770 A2 | 9/1993 |
| EP | 0812078 A2 | 12/1997 |
| EP | 0859257 A1 | 8/1998 |
| EP | 0926479 | 6/1999 |
| EP | 1063656 A2 | 12/2000 |
| EP | 1432149 | 6/2004 |
| EP | 1774695 A2 | 4/2007 |
| EP | 2131123 A2 | 12/2009 |
| EP | 2266250 A1 | 12/2010 |
| EP | 2450728 A1 | 5/2012 |
| GB | 2161614 A | 1/1986 |
| GB | 2179145 | 2/1987 |
| GB | 2187305 A | 9/1987 |
| GB | 2472178 B | 3/2013 |
| GB | 2514134 A | 11/2014 |
| GB | 2514134 B | 5/2016 |
| JP | S5589721 A | 7/1980 |
| JP | 2537950 B2 | 9/1996 |
| JP | H09159841 A | 6/1997 |
| JP | 2001057115 A | 2/2001 |
| WO | WO-9938042 A1 | 7/1999 |
| WO | WO-2006014298 A2 | 2/2006 |
| WO | WO-2008033997 A1 | 3/2008 |
| WO | WO-2008059187 A1 | 5/2008 |
| WO | WO-2009112286 A1 | 9/2009 |
| WO | WO-2012071490 A2 | 5/2012 |
| WO | WO-2013063041 A1 | 5/2013 |
| WO | WO-2018060530 A1 | 4/2018 |
| WO | WO-2018141681 A1 | 8/2018 |
| WO | WO-2018166920 A1 | 9/2018 |
| WO | WO-2019016263 A1 | 1/2019 |

OTHER PUBLICATIONS

International Search Report and Written Opinion, Application No. PCT/EP2018/069502, dated Aug. 23, 2018, 2 pages.

Aleksic S., et al., "Impairment Evaluation toward QKD Integration in a Conventional 20-Channel Metro Network," Optical Society of America, Mar. 22-26, 2015, 3 pages.

Aleksic S., et al., "Towards a Smooth Integration of Quantum Key Distribution in Metro Networks," Proceedings of the 16th International Conference on Transparent Optical Networks, Jul. 6-10, 2014, pp. 1-4.

Brewer D.A., et al., "Modular Optical Plant and Access Network: Operational Aspects," Proc. EFOC & N (Technology and Infrastructure), 1995, pp. 164-167.

Chapuran T.E., et al., "Optical Networking for Quantum Key Distribution and Quantum Communications," New Journal of Physics, vol. 11, Oct. 7, 2009, pp. 1-19.

Combined Search and Examination Report under Sections 17 and 18(3) for Great Britain Application No. 1704178.1, dated Sep. 14, 2017, 6 pages.

Extended European Search Report for Application No. 17154281.4, dated Jul. 20, 2017, 12 pages.

Extended European Search Report for Application No. 17161330.0, dated Aug. 30, 2017, 10 pages.

First Office Action dated Jun. 2, 2020 for Chinese Application No. 201880018103.7, 17 pages.

Great Britain Combined Search and Examination Report under Sections 17 and 18(3) for Application No. GB1701682.5, dated Jul. 25, 2017, 2 pages.

(56) References Cited

OTHER PUBLICATIONS

International Preliminary Report on Patentability for Application No. PCT/EP2017/075023, dated Apr. 11, 2019, 9 pages.
International Preliminary Report on Patentability for Application No. PCT/EP2018/052108, dated Aug. 15, 2019, 12 pages.
International Preliminary Report on Patentability for Application No. PCT/EP2018/055948, dated Sep. 26, 2019, 9 pages.
International Preliminary Report on Patentability for Application No. PCT/GB2015/051707, dated Sep. 20, 2016, 13 pages.
International Preliminary Report on Patentabilityfor Application No. PCT/EP2018/069502, dated Jan. 30, 2020, 8 pages.
International Search Report and Written Opinion for Application No. PCT/EP2017/075023, dated Feb. 1, 2018, 10 pages.
International Search Report and Written Opinion for Application No. PCT/EP2018/052108, dated Mar. 27, 2018, 13 pages.
International Search Report and Written Opinion for Application No. PCT/EP2018/055948, dated Jun. 8, 2018, 11 pages.
International Search Report for Application No. PCT/GB2009/001409, dated Dec. 4, 2009, 6 pages.
International Search Report for Application No. PCT/GB2009/001416, dated Sep. 22, 2009, 6 pages.
International Search Report for Application No. PCT/GB2015/051707, dated Aug. 21, 2015, 4 pages.
Mittal, Packet Delay, University of California Berkeley, All Document, Sep. 2014. Retrieved from the Internet: URL: https://inst.eecs.berkeley.edu/-cs 168/fa 14/discussion/slides1.pdf.
Examination Report for Great Britain Application No. GB1616607.6, dated Mar. 6, 2017, 5 pages.
Nweke N.I., et al., "EDFA bypass and filtering architecture enabling QKD+WDM coexistence on mid-span amplified links," Technical Digest CD-ROM/conference on Lasers and Electro-Optics, Quantum Electronics and Laser Science Conference, Conference On Photonic Applications, Systems and Technologies, May 21, 2006, 2 pages.
Office Action dated Feb. 14, 2017 for Korean Application No. 10-2016-7036681 filed Jun. 10, 2015, 4 pages.
Prysmian Cables and Systems, "Rack & Cabinets," Issued, Feb. 1, 2010, 4 pages.
Prysmian Cables and Systems, Racks, "Optical Consolidation Rack (OCR)," Retreived from: www.prysmiangroup.com, Apr. 2012, Issue 5, 3 pages.
Rohde H., et al., "Quantum Key Distribution Integrated into Commercial WDM Systems," IEEE, Fiber Optics Communications, Quantum Communications, Feb. 24, 2008, 3 pages.
Runser R J., et al., "Demonstration of 1.3 µm Quantum Key Distribution (QKD) Compatibility with 1.5 µm Metropolitan Wavelength Division Multiplexed (WDM) Systems," Fiber Optics Communications, Quantum Detectors, vol. 3, Mar. 6, 2005, 3 pages.
Search Report dated Dec. 15, 2012 for Great Britain Application No. GB1020663.9, filed Jun. 5, 2009,1 page.
Search Report dated Nov. 22, 2012 for Great Britain Application No. GB1020657.1 filed Jun. 5, 2009, 1 page.
Search Report dated Mar. 26, 2012 for Great Britain Application No. GB1020657.1 filed Jun. 5, 2009, 1 page.
Search Report dated Dec. 8, 2014 for Great Britain Application No. GB1411408.6 filed Jun. 26, 2014, 5 pages.
Second Office Action dated Sep. 10, 2020 for Chinese Application No. 201780067271.0, 14 pages.
Written Opinion for Application No. PCT/GB2015/051707, dated Aug. 21, 2015, 5 pages.
Office Action For Chinese Application No. 201880057762.1, dated Apr. 22, 2021, 15 pages.
Office Action For Chinese Application No. 201880057762.1, dated Oct. 21, 2021, 7 pages.

\* cited by examiner

New Test

OPTICAL FIBER

PRIORITY CLAIM

The present application is a National Phase entry of PCT Application No. PCT/EP2018/069502, filed Jul. 18, 2018, which claims priority from EP Patent Application No. 17182399.0, filed Jul. 20, 2017, which is hereby fully incorporated herein by reference.

TECHNICAL FIELD

The disclosure relates to optical communications in general and to an optical fiber for improved loss measurement.

BACKGROUND

Fiber to the Premises (FTTP) provides optical fiber all the way from the exchange or switching center to a customer's premises. At the customer end of the fiber, which is commonly cut to length at the customer premises, an optical connector is required to terminate the fiber in order to facilitate connection into the customer's premises equipment. The desire to quickly connect the customer's premises equipment has led to the introduction of a field-fit connector, which involves a mechanical method of placing a connector on the freshly cut end of the fiber. As the name suggests, the connectors are fitted in-situ, so quality assurance of the connection is problematic when compared to, say, optical assemblies created in a manufacturing facility. Field-fit connectors (also known as field-installable connectors or field-assembly connectors) are mechanical in nature and can be prone to faults relating to fitting of the connectors to the fiber and the finishing of the fiber itself that can adversely affect service. For example, quality issues with field-fit connectors can introduce excessive losses leading either to no service continuity necessitating rework or to a degradation of the service provided to the customer over time leading to the need for restorative work during the lifetime of the connection. Unlike factory-fitted fusion-splice connections, the lack of a reliable confirmation system for field-fit connecters, means that faults with them can be difficult to detect. There is therefore a need for an improved method for reliably checking that a field-fit connector has been properly fitted to the fiber.

Field-fit connector loss relates to losses arising from the quality of the fiber joint created when the field-fit connectors is mated with a second optical fiber, e.g. through a second connector. Losses may be caused by several factors, including gaps between the cut end of the and the end of an optical fiber in a mating connector, misalignment of the fiber within the connector and where the cut end of the fiber is not properly cleaned and polished. One way to detect a quality issue with field-fit connecters, is to measure the optical loss through the connector after fitting to the fiber. However, it can be difficult to get an accurate measurement of the optical loss of the connector in the field, i.e. once fitted to the fiber at the customer's premises. One way to do this is to take readings of optical power in light received from the network with a view to quantifying the loss introduced by the connector. This works by taking a first reading at the distribution point of optical power in light received from the network without the drop fiber and then taking a second reading at the customer premises of optical power in light received from the network taken after the drop fiber and connector has been fitted. From a comparison of the two optical power readings, the loss introduced by fitting the connector can then be estimated (e.g. as the loss in the drop fiber will also contribute to the second power reading). However, this requires action at both the distribution point and the customer premises and can be time-consuming, especially where the distribution point is located remote from the customer premises.

Current techniques for fitting and testing a fiber from a connectorized distribution point to the customer's premises in FTTP are represented in FIGS. 1 to 3. FIG. 1 shows a conventional distribution point 102 (e.g. located at a telegraph pole, a buried junction box or PCP) that is the closest point with suitable connectors in access network 10 to the customer's end 120 of drop fiber 122. Light 118 from the network (e.g. light from a local switching center—not shown) passes along fiber 110 to the distribution point 102. At the distribution point 102, the fiber 110 from the network is terminated in a factory-fit connector 112 suitable for connection via a second factory- or field-fit connector 114 to the drop fiber 122 to the customer's premises 120. The customer's end 120 of drop fiber 122 is provided with a field-fit connector 116. Connector loss measurement will now be described with reference to FIG. 2. As shown in FIG. 2, before the drop fiber 122 is connected, an optical power meter 222 is connected via a patch cord 224 fitted with a factory-fit connector 226 to the distribution point 102, i.e. in place of the drop fiber 122. The optical power meter 222 is connected via patch cord 224 and connectors 226 and 112 at the distribution point 102 to the fiber 110 from the network. The optical power meter 222 allows measurement of light from the network (e.g. light from the local switching—not shown). For example a typical optical power reading at this point may be −15 dBm.

Once the power measurement is complete, the patch cord and power meter can be disconnected and the drop fiber 122 is connected (as shown in FIG. 1) to provide service to the customer's premises. FIG. 3 shows the distribution point, with the patch cord 224 and optical power meter 222 removed. In their place, is connected the drop fiber 122 running to the customer's premises. Light from the network can now propagate to the end of the fiber at the customer's premises.

As shown in FIG. 3, a power meter 310 is attached to the field-fit connector 116 at the customer's premises. The optical power received from the network (for example, from the exchange or switching center) at the field-fit connector can then be measured. A typical optical power reading at this point may be −17 dBm. From the difference in power levels (i.e. −15−(−17)) the loss (2 dB in this example) introduced by the combination of the field-fit connector 116 and drop fiber 122 may be determined.

SUMMARY

According to a first aspect of the disclosure, there is provided a method of quantifying loss associated with an optical connector that is connected to an end of an optical fiber; in which the optical fiber comprises a plurality of embedded optical reflectors distributed periodically along the length of the fiber, in which the method comprises: inserting an optical signal into the fiber through the optical connector; measuring a component of the optical signal reflected by at least one of the plurality of embedded optical reflectors, in which the component is received through the optical connector; calculating the difference in power level between the inserted and reflected signals; and quantifying, based on the calculated power level difference and the reflectivity of the embedded optical reflector, the loss associated with the optical connector.

In this way, embodiments of the disclosure provide a method of calculating losses more accurately and more conveniently allowing field engineers to verify the correct installation of the field-fit connector quickly with more effectively. Embodiments of the disclosure reduce process steps for installing a drop fiber to customer premises, for example, by not requiring any action at the exchange or at any intermediate location along the fiber.

According to an embodiment, the optical fiber connects a switching center and a customer premises; in which the end of the optical fiber to which the optical connector is connected is located at the customer premises.

According to an embodiment, the method comprises cutting the optical fiber to length at a point located between the at least one of the plurality of embedded optical reflectors and a second one of the plurality of embedded optical reflectors and fitting the connector to the end of the fiber.

According to an embodiment, the plurality of embedded optical reflectors is configured to reflect light at the same wavelength.

According to an embodiment, the at least one of the plurality of embedded optical reflectors comprises the optical reflector closest along the fiber to the optical connector.

According to an embodiment, each embedded optical reflector comprises a fiber Bragg grating.

According to an embodiment, the method comprises attaching a test equipment to the optical connector; in which the test equipment comprises a source of the optical signal, an interface configured to insert the optical signal into the fiber through the optical connector and configured to receive the component of the optical signal from the fiber through the optical connector, and a detector to detect the power of the received component of the optical signal.

According to an embodiment, the method comprises: attaching to the test equipment, in place of the optical connector, a calibration component with a reflectivity similar to the reflectivity of the at least one embedded optical reflector located closest to the optical connector along the fiber; carrying out a calibration measurement; in which the calibration measurement comprises operating the test equipment to: insert an optical signal into the calibration component; measure a component of the optical signal reflected by the calibration component; calculate the difference in power level between the inserted and reflected signals; and quantify, based on the calculated power level difference and the reflectivity of the calibration component, the loss associated with the test equipment when connected to the calibration component.

According to a second aspect of the disclosure, there is provided an optical fiber comprising a plurality of embedded optical reflectors distributed periodically along the length of the fiber.

In this way, embodiments of the disclosure provide an optical fiber that enables a simplified and more efficient method of measuring losses, allowing field engineers to verify the correct installation of a field-fit connector quickly with more effectively. The optical fiber reduces process steps for installing a drop fiber to customer premises, for example, by not requiring any action at the exchange or at any intermediate location along the fiber.

According to an embodiment, the embedded optical reflectors are fiber Bragg gratings. According to an embodiment, the plurality of embedded optical reflectors is configured to reflect light at the same wavelength. According to an embodiment, the location along the fiber of each of the plurality of embedded optical reflectors is marked externally.

The optical connector and/or optical fiber may be for use in the field of optical telecommunications.

The fiber may contain 10 or more reflectors, may contain 20 or more reflectors and for example may contain 30 or more reflectors. Reflectors may be present along more than half of the length of the fiber. Reflectors may be present along substantially the whole length of the fiber. The separation of the reflectors may be more than 5 m. The separation of the reflectors may be between greater than or equal to 10 meters and less than or equal to 20 meters. The separation of the reflectors can be greater than or equal to 14 meters and less than or equal to 16 meters.

According to a third aspect of the disclosure there is provided a drop cable for supply of communication services to a customer; in which the drop cable comprises the optical fiber. According to an embodiment, the cable connects a switching center and a customer premises.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 4:
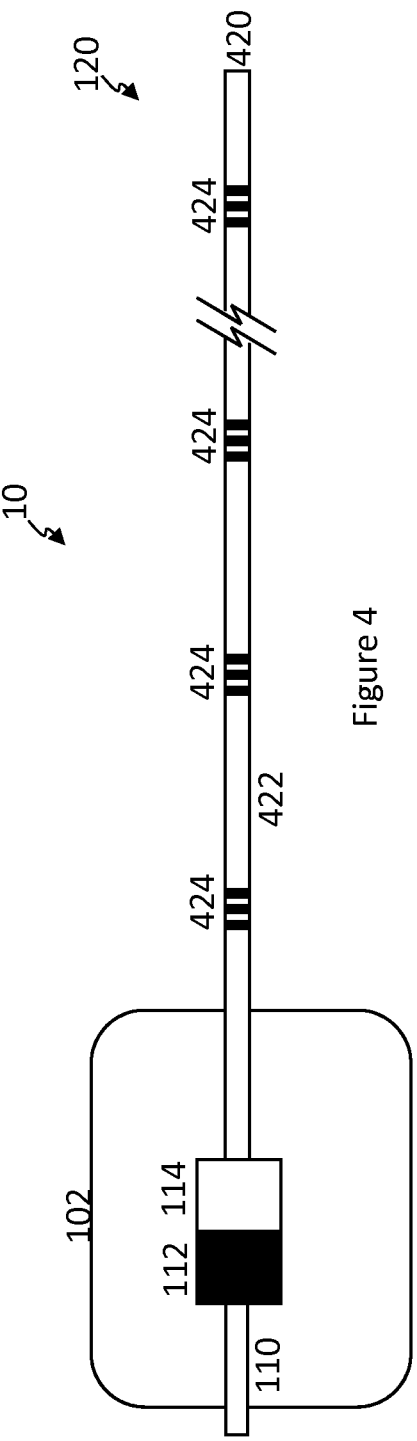

As shown in FIG. 4, according to the embodiment, the distribution point 102 is connected to the customer's premises 120 by a drop fiber 422 in which a plurality of distributed Bragg reflectors (i.e. Fiber Bragg Gratings (FBG)) 424 are embedded at regular intervals along the drop fiber, so that, when the fiber is cut to length, a grating 424 will be located within a specified maximum distance of the cut end 420. To facilitate cutting the fiber at a suitable location between adjacent FBGs, for example within a preferred distance of a FBG whilst avoiding cutting into one of the FBGs, the location along the fiber of each of the plurality of FBGs is marked externally, e.g. on the exterior of the fiber or on the exterior of a cable comprising the fiber. This provides an efficient method of ensuring that a suitable optical reflector lies within a predetermined distance of the customer's end 420 of the drop fiber, even when the drop fiber is cut to length in-situ and the final length of the drop fiber is not known in advance. The maximum distance from the customer's end 420 of the drop fiber to the FBG 424 closest to the customer's end 420 of the drop fiber will be limited by the spacing. According to alternative embodiments, FBGs may be located periodically (i.e. at intervals) along the drop fiber. The intervals may be regular or irregular depending on, for example, ease of manufacture and, where the intervals are irregular, at intervals in which the maximum distance between adjacent FBGs falls within a predetermined value. This provides an efficient method of ensuring that a FBG will lie within a predetermined distance of the customer's end of the drop fiber even when the drop fiber is cut to length in-situ and the final length of the drop fiber is not known in advance. A suitable spacing may be selected so that this distance will be much less than the total length of the drop fiber from the customer's end to the distribution point. The choice of spacing between FBGs will be a balance between cost and accuracy. Due to losses in the fiber itself, the lower the spacing, the higher the accuracy. According to an embodiment, an FBG spacing along the fiber of 15 m is used as this will keep the round-trip loss to approximately 0.01 dB or less and so have a negligible effect on the measurement accuracy.

By keeping the distance along the fiber from the cut end to the closest FBG within limits by use of embedded gratings, the accuracy of loss measurements is increased while, as will be described later, the use of embedded optical reflectors reduces the number of steps required to check a field-fit connector.

FBGs 424 are passive components which can be fabricated by changing the refractive index of a fiber in multiple, periodic bands (schematically represented by the vertical black bars in the Figures). The pitch and width of these bands allows the FBG to be "tuned" to reflect a specific wavelength of light (the "FBG wavelength") and to reflect a certain proportion of the power at that wavelength. The width of the grating determines the bandwidth (also known as the full-width-half-maximum (FWHM)) of the reflector, centered on the central "Bragg wavelength". A bandwidth of 0.6 nm has been found to be acceptable, although other values may be preferred, depending on the circumstances applying in a particular network. This is a trade-off, as the narrower the grating bandwidth, the more precisely the test signal light source has to be controlled leading to higher costs, while a looser spec results in more spectrum being consumed. A variation in the test signal wavelength of ±10 nm has been found to be acceptable, although higher precision may be desirable, depending on the circumstances applying in a particular network.

That is, the FBGs 424 send the optical power (or a proportion of the optical power) at a specific wavelength back towards the source, rather than allowing forward transmission. The FBGs 424 can be designed to reflect a specific wavelength (e.g. that does not interfere with data transmission). A FBG can be inscribed into a fiber very efficiently as the fiber is pulled from the preform in conventional optical fiber manufacture. According to an embodiment, the plurality of FBGs is configured to reflect light at the same wavelength. There is a need to avoid any wavelengths used in normal operation of the fiber. According to an embodiment, the preferred wavelength will correspond to the ITU reserved monitoring bands of 1625 nm-1650 nm. In cases where 1625 nm is used by engineers to test the network from the customer premises, 1650 nm would be a preferred wavelength, although other wavelengths may be used on a particular network, depending on the circumstances applying to that particular network.

The reflectivity of the FBGs 424 is set during the manufacturing process and may be checked to ensure that the grating conforms to the required reflectivity. The fiber 110 is connected at the distribution point 102 (e.g. using a reliable fusion splicing technique) by direct termination onto the drop cable 422 or (as shown in the Figure) by a factory-fitted connector 414 (i.e. by a connector whose fitting, was carried out under optimum conditions at a manufacturing facility, and has been checked, e.g. by the manufacturer—either at the manufacturing facility or at a suitable test facility).

Figure 5:
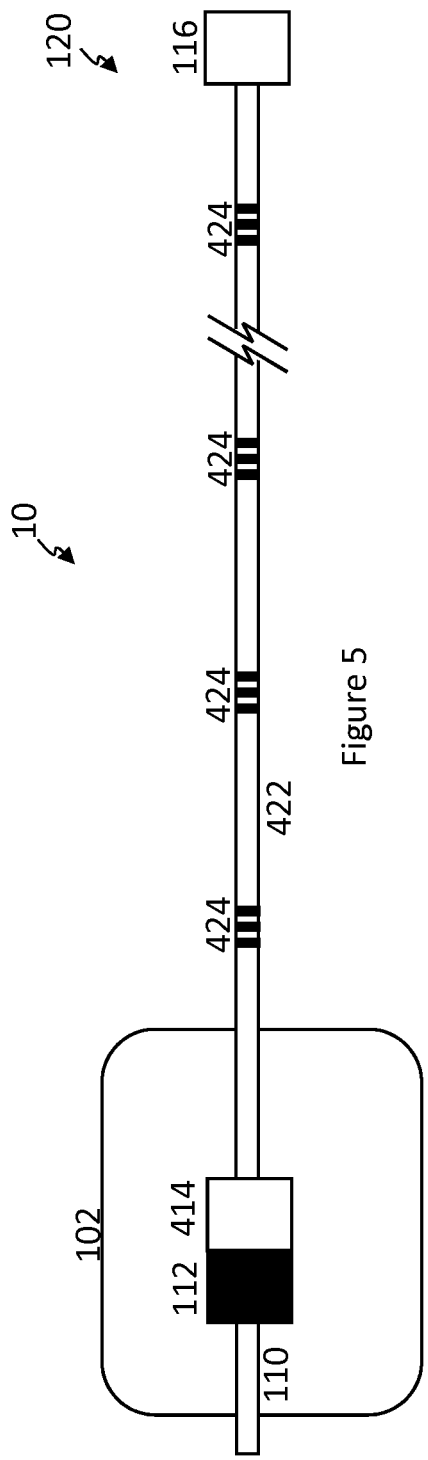

FIG. 5 shows a conventional field-fit connector 116 fitted to the end of the drop fiber 422 at the customer's premises 120. The exact attachment method for a field-fit connector will be as specified by the manufacturer but will, in general, involve removal of outer coatings and cutting to length before insertion into and fixing to the connector 116.

Figure 6:
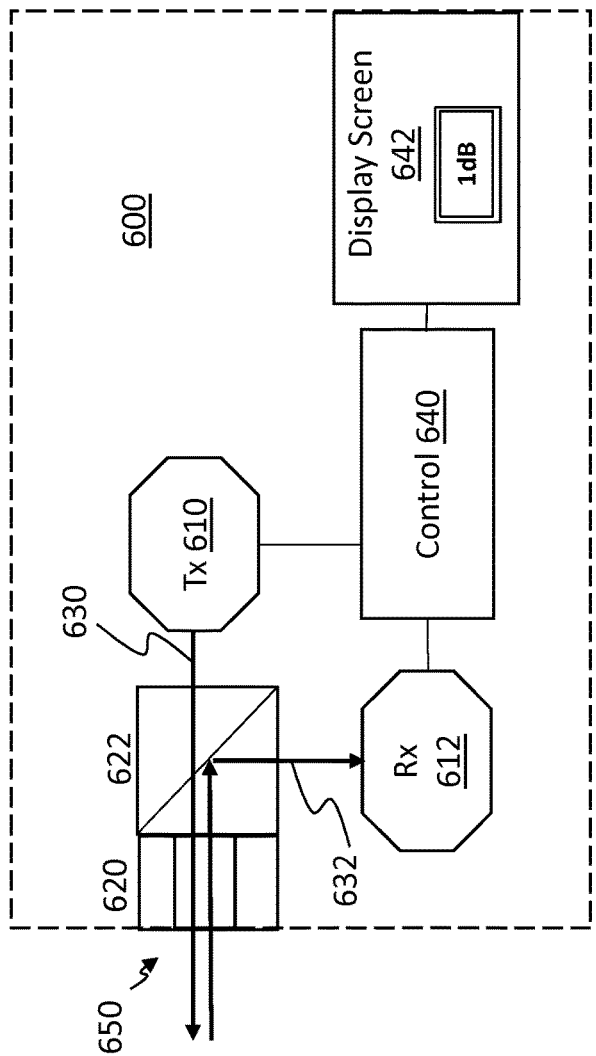

FIG. 6 shows test equipment 600 designed for connection to the field-fit connecter 116 on drop fiber 422 to measure the loss introduced by the fitting of field-fit connector 116 to the drop fiber 422. The test equipment 600 comprises a light source 610 (Tx) and an optical receiver, e.g. a photodiode, 612 (Rx) connected to send and receive light, respectively through a factory fitted connector 620 that mates, in use, with the field-fit connector 116 of the drop fiber. The test equipment 600 also comprises power splitter or diplexer 622. The diplexer 622 is a wavelength division multiplexer which can separate or combine specific wavelengths of light onto a single fiber. The diplexer 622 is configured to guide transmitted light 630 from the source 610 into the drop fiber via the diplexer 622 and the factory-fit connector 620 and to guide the reflected light 632 received via the factory-fit connector 620 and the diplexer 622 from the drop fiber to the receiver 612. Factory-fit connector 620 presents an interface 650 to field-fit connector 116 for interchange of optical signals 630 and 632. The power-level of the transmit light from the source may be measured or controlled. For example, the light source may be calibrated to transmit at a predetermined power level. This may include internal feedback control (not shown), for example by using a back-facet diode to monitor the optical power output. The reflected light received from the fiber is connected to an optical power meter (not shown) for measurement. Suitable optical power meters include the OPM1 Optical Power Meter from AFL of Duncan, S.C. 29334, USA. The embodiment may be implemented with both source 610 and receiver 612 configured to work with light in a narrow band around the FBG wavelength. That is, where the source 610 is configured to transmit at the FBG wavelength and source and receiver power levels are measured at the FBG wavelength.

The test equipment 600 may be constructed from standard optical components such as may be used to make a bidirectional optical transceiver. According to an embodiment, these components could consist of the diplexer, a receiver optical sub assembly (ROSA) and a transmitter optical sub assembly (TOSA). The ROSA could comprise an avalanche or PIN photodiode photodetector, trans-impedance amplifier and limiting amplifier. The TOSA could comprise a laser diode with back facet monitor and driver circuit. The whole may be controlled by a programmable microcontroller or equivalent electronic logic circuitry 640 configured to detect the difference between the power level of the light 630 sent by the source 610 and the power level of the light 632 received at the receiver 612. A suitable display 642 may be used to provide the result to the field engineer.

Figure 7:
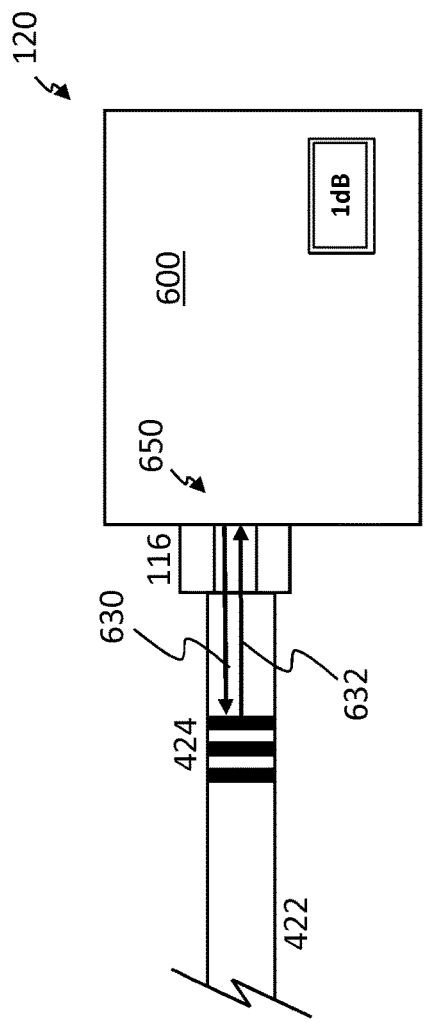

FIG. 7 shows the test equipment 600 from FIG. 6 connected to the field-fit connecter 116 at the customer's premises. As shown in FIG. 7, a test optical signal 630 from the source 610 passes through interface 650 of test equipment 600 and is connected into the customer's side of the field-fit connector 116, from where it propagates along the drop fiber 422 to the FBG 424 closest to the field-fit connector 116 end of the fiber 422 (the "closest FBG"). The closest FBG 424 reflects 632 the test optical signal 630 (or at least a significant proportion of the test optical signal) back towards the field-fit connector 116 end of the fiber 422. The light reflected at the closest FBG returns through the fiber 422 and passes through field-fit connector 116 and interface 650 of test equipment 600 to the receiver measuring device 612 shown in FIG. 6. It will be noted that, unlike conventional methods, there is no requirement for the drop fiber to be lit from the exchange.

A small component (typically no more than 5% for FBGs), of the test optical signal will be passed by the closest FBG and will reach the next-closest (or "second") FBG. A sub-component of the test optical signal, reflected at the second FBG will return to the closest FBG and will experience a large degree (typically at least 95% for FBGs) of reflection, with only a very small sub-sub-component (i.e. no more than 0.25%) of the test optical signal passing the closest FBG again and arriving at the test equipment. Reflected sub-components of the test optical signal from any third or subsequent FBGs will be correspondingly smaller. While all references to the power levels of reflections from the closest FBG are understood to include reflected sub-components from any second, third or subsequent FBGs, the effect of such reflected sub-components on the power readings will be so small as not to materially affect the outcome.

Use of test equipment 600 allows measurement of the power level of the light that is introduced into the drop fiber 422 through the field-fit connector 116 and the power level of the light reflected back from the drop fiber FBG 424 through the field-fit connector 116. The reflectivity of the FBG is also known and we can therefore calculate the loss introduced by the field-fit connector, as follows:

$$\text{field fit connector fibre joint loss (dB)} = \frac{(\text{tx\_pwr} + \text{reflectivity}) - \text{Rx\_pwr}}{2}$$

For example, where the power level of the source transmitted light (tx_pwr) is −4 dBm, the reflectivity of the grating is −3 dB and the power level of the received light (Rx_pwr) is −8 dBm, then the loss is given by:

$$0.5 \text{ dB} = \frac{(-4 + (-3)) - (-8)}{2}$$

Figure 1:
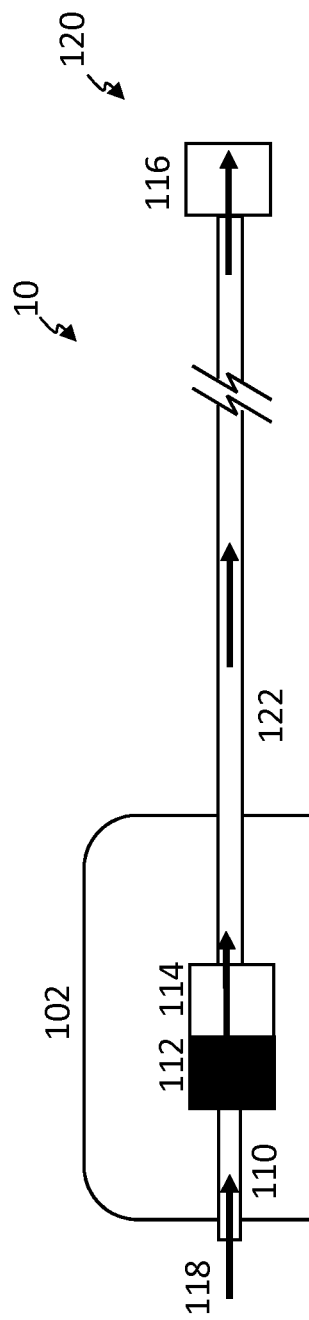
FIGS. 1 to 3 schematically show conventional field-fit connector testing.
Figure 2:
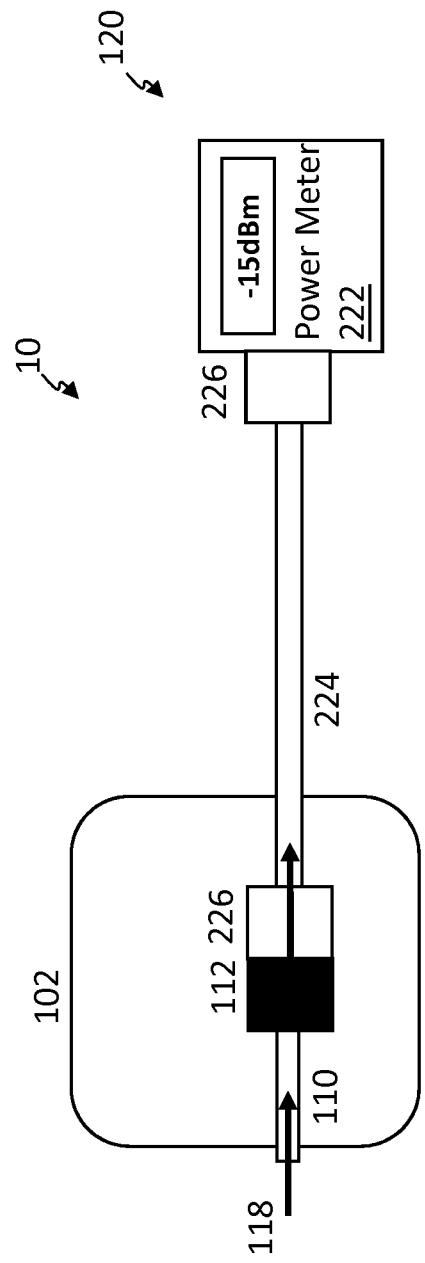
Figure 3:
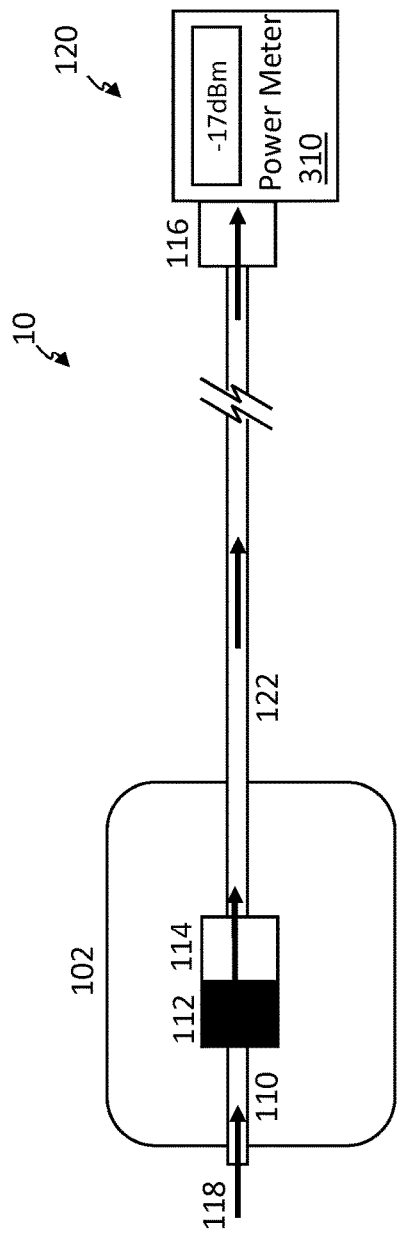
Figure 8:
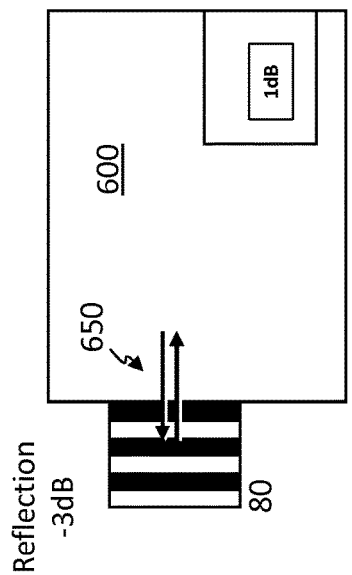
FIGS. 4 to 8 schematically show field-fit connector testing according to an embodiment of the disclosure.

The embodiment may be implemented with an additional operation involving a calibration plug, as shown in FIG. 8. FIG. 8 shows a calibration plug 80 which comprises an optical reflector (e.g. a grating) which has the same reflectivity at the FBG wavelength as the FBGs inserted into the fiber. Use of the calibration plug 80 allows the transmit power to be accurately measured at the interface 650 of test equipment 600 taking into account loss introduced by factory-fit connector 620. The calibration plug can be plugged into the test equipment interface 650 in place of the field-fit connector and the power from the transmitted light that is reflected back to the test equipment by the calibration plug can then be measured by the test equipment in the normal way. This measurement provides a reference against which measurements carried out on field-fit connectors may be compared. Given the reflectivity of the calibration plug optical reflector is known, the power level of the transmitted light provided at test equipment interface 650 to the field-fit connector 116 by the test equipment 600 may be accurately calculated and losses inherent in the test equipment eliminated from the calculation of loss associated with the field-fit connector.

Although of particular benefit in testing field-fit connectors, the embodiments have application in testing the performance of other types of optical fiber connector.

The disclosure relates to an optical fiber comprising a plurality of embedded optical reflectors distributed periodically along the length of the fiber. The invention also relates to a method of quantifying loss associated with an optical connector that is connected to optical fiber comprising a plurality of embedded optical reflectors distributed periodically along the length of the fiber. The method comprises: inserting an optical signal into the fiber through the optical connector; measuring a component of the optical signal reflected by at least one of the plurality of embedded optical reflectors, in which the component is received through the optical connector; calculating the difference in power level between the inserted and reflected signals; and quantifying, based on the calculated power level difference and the reflectivity of the embedded optical reflector, the loss associated with the optical connector.

It will be understood by those skilled in the art that, although the present disclosure has been described in relation to the above described example embodiments, the invention is not limited thereto and that there are many possible variations and modifications which fall within the scope of the invention.

The invention claimed is:

1. A method of quantifying loss associated with an optical connector that is connected to an end of an optical fiber, wherein the optical fiber comprises a plurality of embedded optical reflectors distributed periodically along the length of the fiber, the method comprising:
   inserting an optical signal into the fiber through the optical connector;
   measuring a component of the inserted optical signal reflected by at least one of the plurality of embedded optical reflectors, wherein the component is received through the optical connector;
   calculating a difference in power level between the inserted optical signal and the reflected component of the inserted optical signal;
   quantifying, based on the calculated power level difference and a reflectivity of the at least one of the plurality of embedded optical reflectors, a quantified loss introduced by the optical connector; and
   when the quantified loss is above a predetermined threshold value, determining that the optical connector has not been properly fitted to the optical fiber.

2. The method of claim 1, wherein the optical fiber connects a switching center and a customer premises, and wherein the end of the optical fiber to which the optical connector is connected is located at the customer premises.

3. The method of claim 1, further comprising:
   cutting the optical fiber to length at a point located between the at least one of the plurality of embedded optical reflectors and a second one of the plurality of embedded optical reflectors; and
   fitting the connector to the end of the fiber.

4. The method of claim 1, wherein the plurality of embedded optical reflectors are configured to reflect light at the same wavelength.

5. The method of claim 1, wherein the at least one of the plurality of embedded optical reflectors comprises an optical reflector closest along the fiber to the optical connector.

6. The method of claim 1, wherein each embedded optical reflector comprises a fiber Bragg grating.

7. The method of claim 1, wherein the method further comprises attaching a test equipment to the optical connector, wherein the test equipment comprises:
   a source of the optical signal;
   an interface configured to insert the optical signal into the fiber through the optical connector and configured to receive the reflected component of the inserted optical signal from the fiber through the optical connector; and a detector to detect the power of the received reflected component of the inserted optical signal.

8. The method of claim 7, wherein the method further comprises:

attaching to the test equipment, in place of the optical connector, a calibration component with a reflectivity similar to a reflectivity of the at least one embedded optical reflector located closest to the optical connector along the fiber; and carrying out a calibration measurement, wherein the calibration measurement comprises operating the test equipment to:

insert an optical signal into the calibration component, measure a component of the optical signal reflected by the calibration component, calculate a difference in power level between the inserted optical signal and the reflected component of the optical signal, and quantify, based on the calculated power level difference and a reflectivity of the calibration component, a loss associated with the test equipment when connected to the calibration component.

9. A system comprising:

an optical fiber including a plurality of embedded optical reflectors distributed periodically along a length of the fiber, wherein an optical connector is connected to an end of the optical fiber; and a microcontroller configured to:

quantify a quantified loss introduced by the optical connector based on:

a calculated power level difference between an inserted optical signal and a reflected component of the inserted optical signal, and a reflectivity of at least one of the plurality of embedded optical reflectors, and when the quantified loss is above a predetermined threshold value, determine that the optical connector has not been properly fitted to the optical fiber.

10. The system of claim 9, wherein the plurality of embedded optical reflectors are fiber Bragg gratings.

11. The system of claim 9, wherein the plurality of embedded optical reflectors are configured to reflect light at the same wavelength.

12. The system of claim 9, wherein a location along the fiber of each of the plurality of embedded optical reflectors is marked externally.

13. The system of claim 9, further comprising:

a drop cable for supply of communication services to a customer, the drop cable comprising the optical fiber.

14. The system of claim 13, wherein the drop cable is arranged to connect a switching center and a customer premises.

\* \* \* \* \*